United States Patent [19]

Low et al.

[11] 3,737,231

[45] June 5, 1973

[54] HIGH PULSE RATE HIGH RESOLUTION OPTICAL RADAR SYSTEM

[76] Inventors: George M. Low, Deputy Administrator of the National Aeronautics and Space Administration with respect to an invention of; Willis C. Goss, Altadena; Richard H. Burns; Ko-Chuan Chi, both of Pasadena, all of Calif.

[22] Filed: Nov. 13, 1970

[21] Appl. No.: 89,210

[52] U.S. Cl. .......................... 356/5, 356/4, 332/7.51, 250/199, 331/94.5
[51] Int. Cl. ................................................ G01c 3/08
[58] Field of Search ..................... 350/150; 332/7.51; 330/4.3; 331/94.5 M; 250/199; 356/4, 5

[56] References Cited

UNITED STATES PATENTS

| | | | |
|---|---|---|---|
| 3,521,188 | 7/1970 | Sooy | 331/94.5 |
| 3,277,393 | 10/1966 | Nicolai | 331/94.5 M |
| 3,521,069 | 7/1970 | DeMaria et al. | 250/199 |
| 3,407,364 | 10/1968 | Turner | 250/199 |
| 3,395,367 | 7/1968 | Bell et al. | 331/94.5 |

FOREIGN PATENTS OR APPLICATIONS 1,492,057 7/1967 France .............................. 331/94.5

OTHER PUBLICATIONS

Michon et al., Physics Letters, Vol. 21 No. 5 June 1966 pp. 514–515.

*Primary Examiner*—Benjamin A. Borchelt
*Assistant Examiner*—S. C. Buczinski
*Attorney*—Monte F. Mott, John R. Manning and Paul F. McCaul

[57] ABSTRACT

A radar transmitting system is disclosed for transmitting an optical pulse to a target comprising an optical cavity containing a laser incorporating a mode-locking means to build up an optical pulse. An optical switch is also provided within the cavity to convert the polarization of the optical pulse generated within the cavity. The optical switch comprises an electro-optical crystal driven by a time delayed driver circuit which is triggered by a coincident signal made from an optical pulse signal and a gating pulse signal. Upon being energized, the electro-optical crystal functions to convert the polarization of the optical pulse as it passes through the crystal. This converted optical pulse then strikes a polarization sensitive prism and is deflected out of the cavity toward the pending target in the form of a pulse containing most of the optical energy generated by the laser in the pulse build-up period. After striking the target, the reflected energy is picked up by a transceiver with the total travel time of the pulse being recorded. This travel time is a measure of the distance from the transceiver to the target.

1 Claim, 1 Drawing Figure

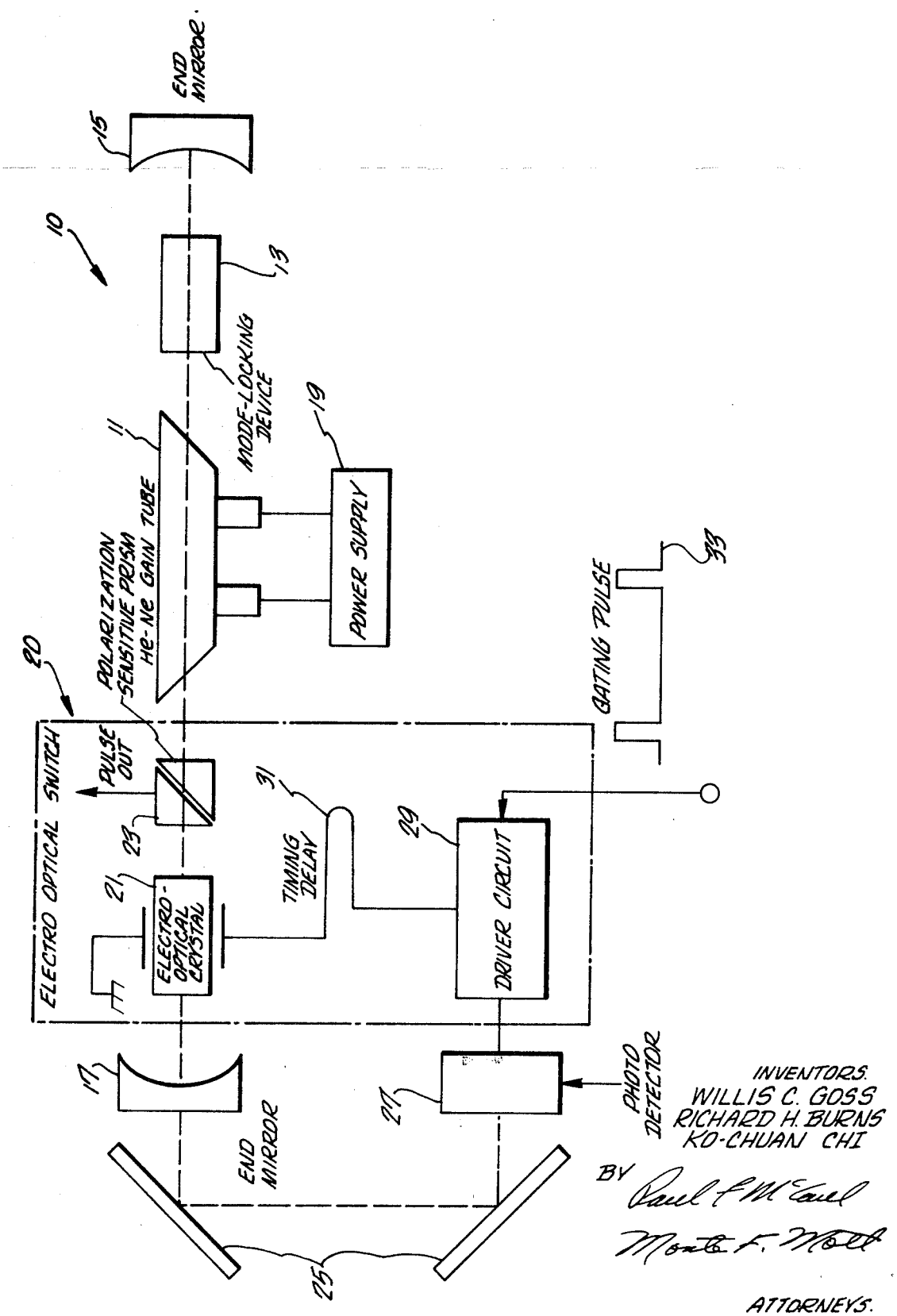

HIGH PULSE RATE HIGH RESOLUTION OPTICAL RADAR SYSTEM

ORIGIN OF THE INVENTION

The invention described herein was made in the performance of work under a NASA contract and is subject to the provisions of Section 305 of the National Aeronautics and Space Act of 1958, Public Law 85–568 (72 Stat. 435; 42 USC 2457).

BACKGROUND OF THE INVENTION

1. Field of the Invention

The present invention relates to laser optical radar systems utilizing the emission and propagation of energy in the form of pulsed laser light waves and more particularly to obstacle detectors for measuring distances to impending targets.

2. Description of the Prior Art

Radar systems have been proposed for many types of ranging measuring apparatus. A very prominent use today is in the aerospace applications. Moreover, with the advent of space exploration, radar systems are being proposed as obstacle detectors for unmanned lunar or planetary roving vehicles. However, such interplanetary applications are not without problems which are unique for such system applications. Because of the long lag time involved in controlling such roving vehicles from earth, these vehicles must be substantially autonomous. Therefore, for successful navigation, a sensor is required that can detect possible obstacles such as rocks, holes and impassable slopes, and relay their type and location to an onboard computer.

In utilizing radar the sensor performs this detecting function by scanning the area in front of the vehicle with an electromagnetic beam that will yield range data as a function of azimuth and elevation. The rocks and holes will be identifiable by the range variations and discontinuities observed as the beam sweeps over them.

Although various radar systems have been proposed for range measuring purposes, one type of radar system that has been given serious consideration for use in the roving vehicle is the pulse radar system.

In a pulse type radar a series of accurately timed and very short pulses of energy are sent out by a transceiver to a target. On striking the target some of the energy is reflected. These reflections or echoes are subsequently picked up by the transceiver. The time required for any one pulse to travel to the target and back to the transceiver is a measure of the distance from the transceiver to the target. The usual way of measuring this time interval is to turn on a gate at the time a pulse is sent out and then with a very stable clock or oscillator count the elapsed time until the echo pulse is received. This time is directly proportional to the distance.

Pulse radar systems utilizing radio frequency energy can be used in range finding applications; however, such systems are severely handicapped by poor angular and range resolution.

Another pulse radar system is a pulse mode-locked laser system. A serious shortcoming with present day mode-locked laser systems is range ambiguity. This range ambiguity occurs because of the closely spaced pulse intervals. Typically, a laser two feet long will emit pulses four nanoseconds apart. As a result, if a string of such pulses were used for ranging, the range data from an object ten feet away would be identical to the data from an object twelve, fourteen or sixteen feet away.

OBJECTS AND SUMMARY OF THE INVENTION

The present invention obviates the above mentioned shortcomings by providing a radar system that is capable of operating in a relatively simple mode of operation with a high degree of resolution. The radar system comprises an optical cavity having a mode-locked laser, e.g., a helium-neon gain tube, contained therein for building up the optical pulse of the laser. An optical switch is also provided within the cavity to convert the polarization of the optical pulse as it passes therethrough. The optical switch comprises an electro-optical crystal driven by a time delayed driver circuit which is triggered by a coincident signal made from an optical pulse signal and a gating pulse signal. Upon being energized, the electro-optical crystal functions to convert the polarization of the optical pulse as it passes through the crystal. After the optical pulse has been converted, it strikes a polarization sensitive prism and deflects out of the cavity in the form of a pulse containing most of the optical energy generated by the gain tube in the pulse build-up period. The optical pulse recovers the full energy within the optical cavity within a period of the order of microseconds and may thus be repetitively switched out at any rate desired, up to the megahertz region.

A primary object of the present invention is to provide an obstacle detector utilizing a laser radar system that is capable of emitting optical pulses of short pulse length with a greater time separation without a substantial loss of average power.

Another object of the present invention is to provide laser radar apparatus that is capable of producing optical pulses having a pulse power many times greater than the continuous wave power of the laser without substantial loss of average power.

A further object of the invention is to provide a laser apparatus having mode-locking means for causing the resulting optical light in the laser to bunch into pulses four to six inches long.

Still another object of the present invention is to provide a mode-locked laser having novel modulating means for causing the optical pulse to be emitted out of the optical cavity.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings.

BRIEF DESCRIPTION OF THE DRAWING

The FIGURE is a diagrammatic view of the mode-locked laser obstacle detector of the present invention.

DESCRIPTION OF THE PREFERRED EMBODIMENT

Referring now to the drawing, the FIGURE shows a radar system, generally indicated by arrow 10, formed within a low-loss optical cavity. The radar system comprises a laser 11, for example a helium-neon gain tube, which is powered by a conventional power supply 19. A mode-locking means 13 and a pair of end mirrors 15 and 17 are also provided within the optical cavity in the optical path of the beam formed by the laser 11.

The radar system 10 further includes an electro-optical switch, generally indicated by arrow 20, comprising an electro-optical crystal 21 and a polarization sensitive prism 23, both elements intersecting the optical path of the laser beam. The electro-optical switch 20 further includes a driver circuit 29 having timing delay means 31 electrically interconnecting the driver circuit 29 with the crystal 21. A pair of reflectors 25 are positioned at one end of the optical cavity behind the end mirror 15. A photo detector 27 is positioned adjacent the second reflector and is electrically connected to the driver circuit 29. Finally, a gating pulse train 33 is also electrically connected to the driver circuit 29.

OPERATION

At the beginning of the operation, the electro-optical switch is inoperable while the laser 11 begins to oscillate a beam of light between the end mirrors 15 and 17. During such oscillation, the mode-locking means 13 cooperates with the laser 11 to cause the resulting light beam to bunch into one pulse approximately four to six inches long with the pulse gaining amplitude with each pass through the laser 11. As stated above, the electro-optical crystal is inactivated during this time and has no effect on the optical pulse as it passes through the crystal. During such oscillation, little energy is lost at the mirrors 15 and 17 because of their highly efficient reflectance. However, a small amount of light does pass through the end mirror 17 and is reflected by the reflectors 25 to the photo detector 27. The light signal is then converted into an electrical signal which, in turn, is fed into the driver circuit 29. The gating pulse train 33 also feeds a signal into the driver circuit with the gating pulse occurring at the end of each build-up period.

When the electrical signal created from the small light passing through the end mirror 17 is coincident with the gating pulse, the electro-optical crystal 21 is triggered shortly after the optical pulse has passed through the crystal 21 on its way to the gain tube 11. By the time the optical pulse returns to the crystal 21 full voltage is applied thereto. After which, as the light passes through the crystal 21, reflects off the end mirror 17, and passes again through the crystal 21, its polarity is converted to the opposite polarization. This converted light pulse then strikes the prism 23 and is deflected from the cavity in the form of a sub-nanosecond pulse containing most of the optical energy generated by the gain tube 11 during the pulse build-up period. A light detector (not shown) is then used to measure the distance to a target by noting the elapsed time from the emission of a pulse to the return of its reflection.

Therefore, in accordance with the present invention, a high speed deflection system is provided to complete a scanning laser radar with the capability of making a million distance-to-target measurements per second, with the range resolution of a fraction of a foot to a maximum of 500 feet.

It should be noted that various modifications can be made to the apparatus while still remaining within the purview of the following claims. For example, the laser may be self-locking, or may be locked by a separate discrete component.

What is claimed is:

1. An optical assembly for producing a laser pulse for use in a highly precise clocked radar system comprising:

an optical cavity including at least a first and second reflecting mirror;
   a laser means located within said cavity for oscillating a light beam between said reflecting mirrors;
   mode locking means within said cavity for building said light beam into an optical pulse;
   an electro-optical crystal capable of being electrically triggered for polarizing said optical pulse;
   photo detecting means for removing an optical signal during the reflection of said optical pulse from said first reflecting mirror and converting it into an electrical signal representing the position of said optical pulse at said first reflecting mirror;
   means for generating a constant train of gating pulses;
   a driver circuit means for producing an electrical triggering signal particularly adapted to radar clocking only when a gating pulse of said train of gating pulses is coincident with said electrical positioning signal representing said optical pulse at said first reflecting mirror;
   timing delay means connecting said driver circuit means and said electro-optical crystal for delaying said electrical triggering signal until said optical pulse passes through said electro-optical means towards said second reflecting mirror; and
   means for reflecting said polarized optical pulse out of said optical cavity including a polarization sensitive prism.

* * * * *